(12) United States Patent
Aota

(10) Patent No.: US 6,510,756 B2
(45) Date of Patent: Jan. 28, 2003

(54) BALL SPLINE JOINT AND INTERMEDIATE SHAFT FOR USE IN A STEERING COLUMN ASSEMBLY

(75) Inventor: Kenichi Aota, Nara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/883,984

(22) Filed: Jun. 20, 2001

(65) Prior Publication Data

US 2002/0017155 A1 Feb. 14, 2002

(30) Foreign Application Priority Data

Jun. 27, 2000 (JP) ........................................ 2000-192968

(51) Int. Cl.⁷ .............................. B62D 1/19; F16C 3/03
(52) U.S. Cl. ........................ 74/492; 280/777; 464/167
(58) Field of Search ........................... 74/492; 280/777; 464/167; 384/49, 54

(56) References Cited

U.S. PATENT DOCUMENTS 3,203,202 A * 8/1965 Brownyer ................... 464/167
3,318,170 A * 5/1967 Runkle ........................ 464/167
4,103,514 A * 8/1978 Grosse-Entrup ............ 464/167
5,489,253 A * 2/1996 Ito et al. ....................... 384/51
6,035,740 A * 3/2000 Budaker et al. .............. 74/492

FOREIGN PATENT DOCUMENTS

| JP | 2-146223 | 12/1990 |
| JP | 2-146224 | 12/1990 |
| JP | 2-146225 | 12/1990 |

* cited by examiner

Primary Examiner—William C Joyce
(74) Attorney, Agent, or Firm—Rabin & Berdo, PC

(57) ABSTRACT

A ball spline joint interconnecting an inner shaft and an outer shaft in mutually loose-fitted relation as allowing the shafts to integrally rotate and relatively move from each other in an axial direction. Raceway grooves are respectively formed in the inner shaft and the outer shaft in face-to-face relation and are extended in the axial direction. A plurality of balls are interposed between the corresponding raceway grooves of the inner shaft and the outer shaft, forming an array along the axial direction. A resilient member biases an array-end ball in an angled direction relative to the axial direction.

9 Claims, 7 Drawing Sheets

BALL SPLINE JOINT AND INTERMEDIATE SHAFT FOR USE IN A STEERING COLUMN ASSEMBLY

CROSS REFERENCE TO RELATED APPLICATION

This application claims the benefit under 35 U.S.C.§119 of Japanese Patent application No. 2000-192968 filed on Jun. 27, 2000, the abstract of disclosure of which is incorporated herein by reference.

BACKGROUND OF THE INVENTION

Field of the Invention

The present invention relates to an intermediate shaft for use in a steering column assembly, the intermediate shaft axially contracted upon receiving an impact load of above a predetermined level thereby absorbing the impact energy, and principally to a ball spline joint incorporated in the intermediate shaft for use in the steering column assembly.

DESCRIPTION OF RELATED ARTS

In the steering column assembly of an automobile, the intermediate shaft is interposed between a steering shaft and a steering gear for transmitting a rotative operation force to the steering gear, the operation force being applied to a steering wheel.

When receiving an excessive impact at collision or the like, the intermediate shaft is contracted for impact absorption by a relative axial movement between an inner shaft and an outer shaft which are in loose-fitted relation. Furthermore, the intermediate shaft is arranged to be axially contracted in order to be mounted to the steering shaft or the steering gear when assembled in a vehicle. Moreover, the intermediate shaft is arranged to absorb vibration through expansion and contraction, vibration being produced at the steering gear, for example, when a vehicle is traveling on a bad road, thereby preventing the vibration from being transmitted to the steering shaft.

The intermediate shaft of this type incorporates therein, for example, a ball spline joint for reducing an axial sliding load. The ball spline joint comprises raceway grooves respectively formed in an inner shaft and an outer shaft and having U-shaped sectional shapes in corresponding relation, and a plurality of balls interposed between the corresponding raceway grooves and forming an array along an axial direction of the intermediate shaft.

In the typical ball spline joint, a predetermined gap is provided between an inside surface of the raceway groove and the balls in order to ensure the durability and to reduce a sliding resistance between the inner and outer shafts. The balls in the raceway groove are allowed to move by the amount of the gap. Hence, noises due to the rattling of the balls may result in some cases.

In addition, the above gap permits a rotationwise free play between the inner shaft and the outer shaft. This reduces a response performance for transmitting the rotative operation force, applied to the steering wheel, to the steering gear or causes noises due to the rattling.

An attempt has been made to reduce the rattling by using a resilient member for biasing the balls in the axial direction of the intermediate shaft. Unfortunately, an adequate effect has yet to be achieved.

SUMMARY OF THE INVENTION

In view of the foregoing, the invention has been accomplished and has an object to provide a ball spline joint free from a rotationwise rattle and noises.

For achieving the above object, a ball spline joint for interconnecting an inner shaft and an outer shaft in mutually loose-fitted relation as allowing the shafts to integrally rotate and relatively move from each other in an axial direction, the ball spline joint according to a preferred embodiment of the invention comprises raceway grooves respectively formed in the inner shaft and the outer shaft in face-to-face relation and axially extended, a plurality of balls interposed between the corresponding raceway grooves of the inner shaft and the outer shaft and forming an array in the axial direction, and a resilient member for biasing an array-end ball in an angled direction relative to the axial direction.

According to the embodiment, a stable situation of the array of balls is established by biasing the array-end ball in the angled direction relative to the axial direction, the balls individually pressed against at least either one of the raceway surfaces of the raceway grooves. This is effective to prevent an unwanted movement of the balls between the raceway grooves. As a result, the occurrence of noises can be avoided. Furthermore, a pressing force against the raceway groove is applied via the ball, such that free play (rattle) in the rotating direction can be eliminated. This ensures that the occurrence of noises due to the rattling is prevented.

In one case, the resilient member may be in contact with the array-end ball for directly biasing this ball in the angled direction. In another case, the resilient member may indirectly bias this ball in the angled direction via a spacer.

DETAILED DESCRIPTION OF THE PREFERRED EMBODIMENTS

A preferred embodiment of the invention will hereinbelow be described in detail with reference to the accompanying drawings.

Figure 1:
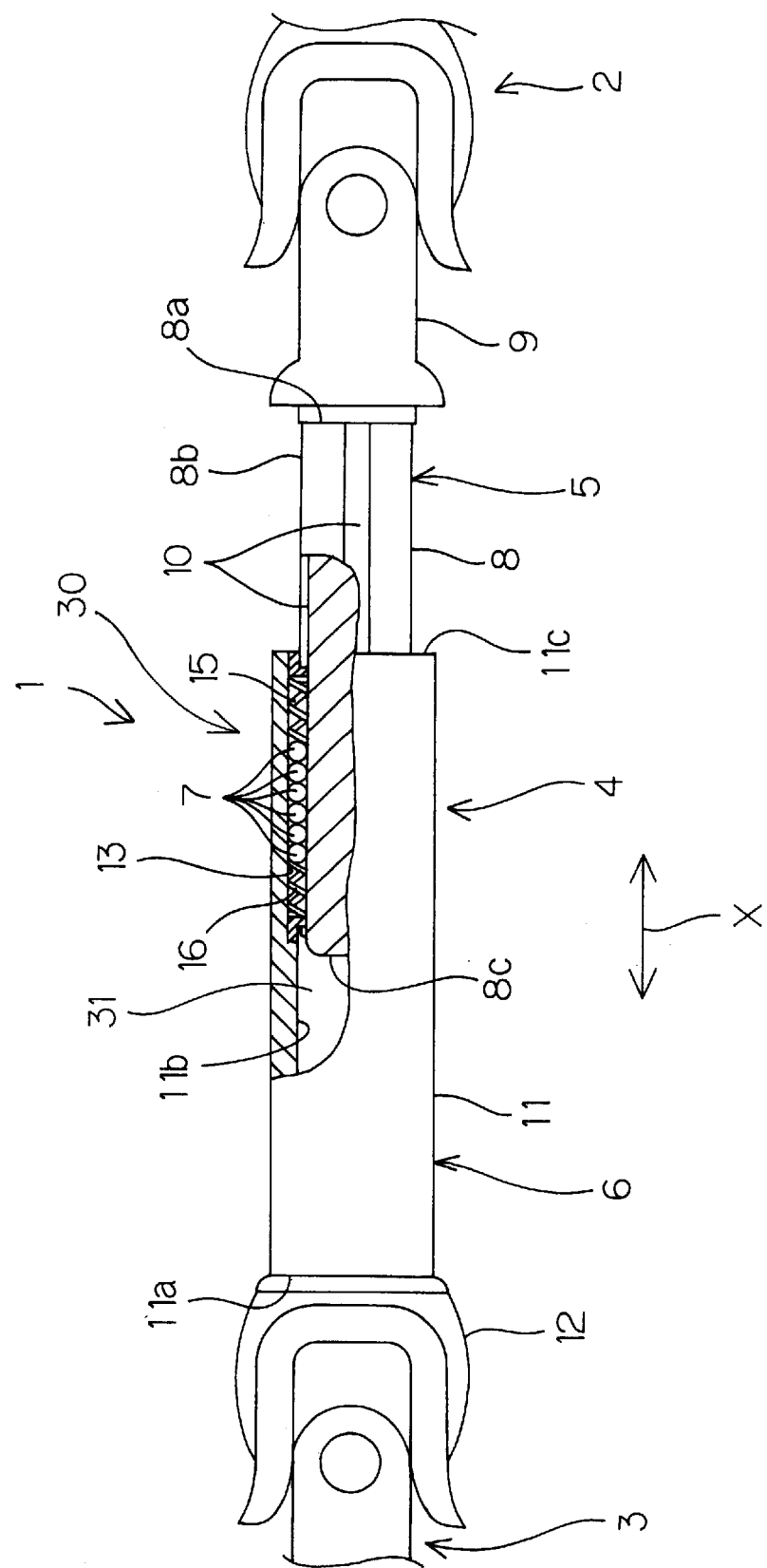
FIG. 1 is a front view, partly in section, of an intermediate shaft according to one embodiment of the invention.
Figure 2:
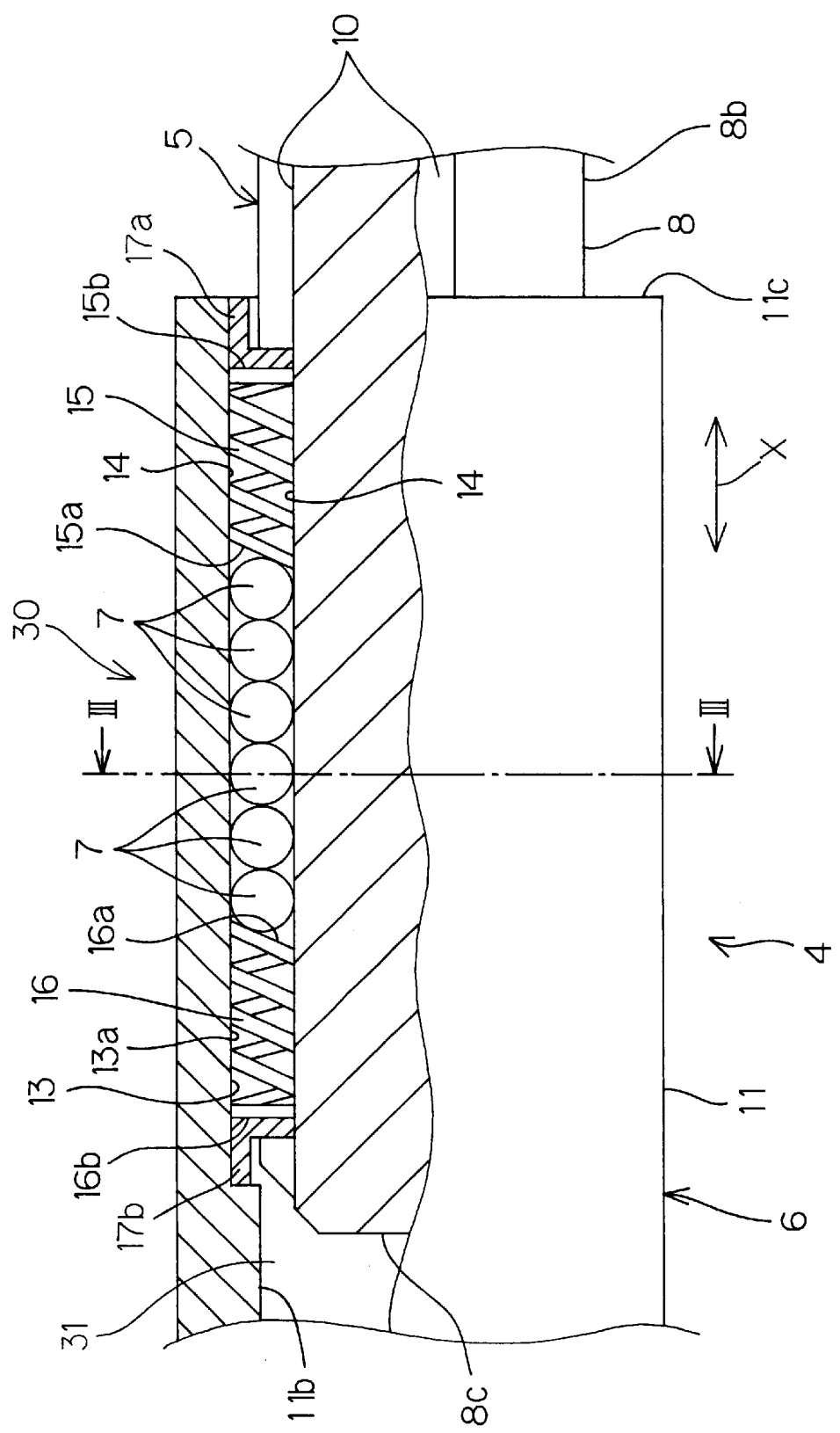
FIG. 2 is an enlarged front view, partly in section, showing a principal portion of the intermediate shaft.

Referring to FIGS. 1 to 4, an intermediate shaft according to one embodiment hereof will be described. As seen in FIGS. 1 and 2, a steering column assembly 1 comprises a steering shaft 2 with an unillustrated steering wheel fixed to one end thereof, a steering gear 3, and an intermediate shaft 4 interposed between the steering shaft 2 and the steering gear 3. The intermediate shaft 4 operates to transmit a rotative operation force to the steering gear 3, the operation force being applied to the steering wheel. The intermediate shaft 4 includes an inner shaft 5 and an outer shaft 6 in fitted engagement with play therebetween. The inner shaft 5 and the outer shaft 6 are interconnected via a ball spline joint 30 including plural arrays of balls 7 as allowed to relatively move from each other in an axial direction X.

When mounted to a vehicle, the intermediate shaft 4 is contracted in the axial direction x so as to be assembled with the steering shaft or the steering gear. When receiving an impact load of above a predetermined level due to collision or the like, the intermediate shaft 4 is arranged to absorb the impact through contraction. The intermediate shaft 4 is also arranged to absorb vibration through expansion and contraction when the vehicle travels on a bad road and the like.

Figure 3:
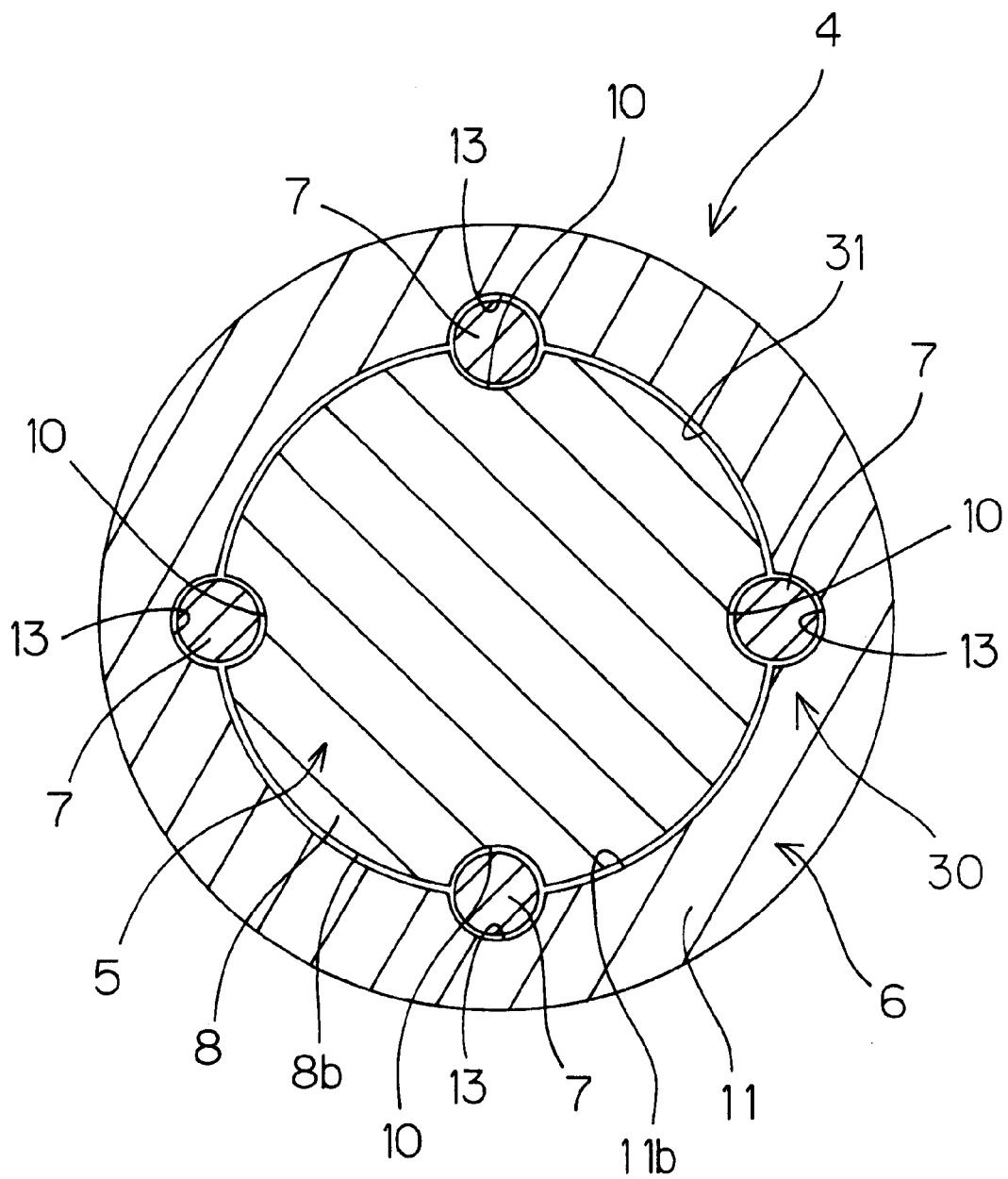
FIG. 3 is a sectional view of the intermediate shaft taken on the line III—III in FIG. 2.

The inner shaft 5 includes a column-like shaft portion 8 and a connecting portion 9 formed at a first end 8a of the shaft portion 8 and cooperating with the steering shaft 2 to define a universal joint. An outer periphery 8b of the shaft portion 8 of the inner shaft 5 is formed with a plurality of raceway grooves 10 each defined by a recessed strip extending from the first end 8a of the shaft portion 8 to a second end 8c thereof along the axial direction X. As seen in FIG. 3, the raceway grooves 10 are disposed along a circumference of the inner shaft 5 at regular space intervals. Each raceway groove 10 has a circular transverse section of a slightly greater radius than that of a ball 7 to be described hereinlater.

The outer shaft 6 includes a cylindrical shaft portion 11 including a connection hole 31, and a connecting portion 12 formed at a first end 11a of the shaft portion 11. The connection hole 31 of the shaft portion 11 has a slightly greater inside diameter than an outside diameter of the shaft portion 8 of the inner shaft 5. The connecting portion 12 is formed at the first end 11a of the shaft portion 11. The connecting portion 12 includes a yoke cooperating with the steering gear to define a universal joint. The shaft portion 8 of the inner shaft 5 is inserted in the connection hole 31 of the outer shaft 6 from the other end 8c of the shaft portion. An inner periphery 11b of the connection hole 31 is formed with a plurality of raceway grooves 13 each defined by a recessed strip of a predetermined length extended from a second end 11c of the shaft portion 11 to the first end 11a thereof in the axial direction X. Each raceway groove 13 has a circular transverse section of a slightly greater radius than that of the ball 7.

The raceway grooves 13 are provided in the same number as the raceway grooves 10 along a circumference of the outer shaft 6 at regular space intervals. Thus, a respective pair of corresponding raceway grooves 10, 13 of the inner and outer shafts 5, 6 are in face-to-face relation.

A plurality of balls 7 are interposed between a respective pair of the raceway groove 10 of the inner shaft 5 and the corresponding raceway groove 13 of the outer shaft 6. Inside surfaces of the raceway grooves 10, 13 define raceways 14a, 14b for the balls 7, respectively. The plural balls 7 so inserted form an array along the axial direction X of the intermediate shaft 4. Opposite ends of the ball array 7 are biased by, for example, first-end portions 15a, 16a of compression springs 15, 16 as a resilient member, respectively.

The compression springs 15, 16 have the same spring constant. The first-end portions 15a, 16a of the compression springs 15, 16 are each of a so-called open-end configuration which includes no end turn. Specifically, the first-end portions 15a, 16a of the compression springs 15, 16 are each inclined at a given angle to a plane orthogonal to a spring axis so that the balls 7 at the opposite ends of the array are each biased in an angled direction relative to the axial direction X. On the other hand, second-end portions 15b, 16b of the compression springs 15, 16 are each of a closed-end configuration which includes an end turn.

The second-end portions 15b, 16b of the compression springs 15, 16 are received by receiving members 17a, 17b of an L-shaped section, respectively. Main bodies of the receiving members 17a, 17b are disposed in the raceway groove 13 of the outer shaft 6.

When the intermediate shaft 4 is contracted in the axial direction X in order to be mounted to the vehicle or upon collision, the ball array 7 moves along the raceways 14a, 14b while contracting either one of the compression springs 15, 16. The raceway groove 13 of the outer shaft 6 has a length to allow the ball array 7 to travel a predetermined distance, such that the relative axial movement between the inner shaft 5 and the outer shaft 6 may be allowed.

Figure 4:
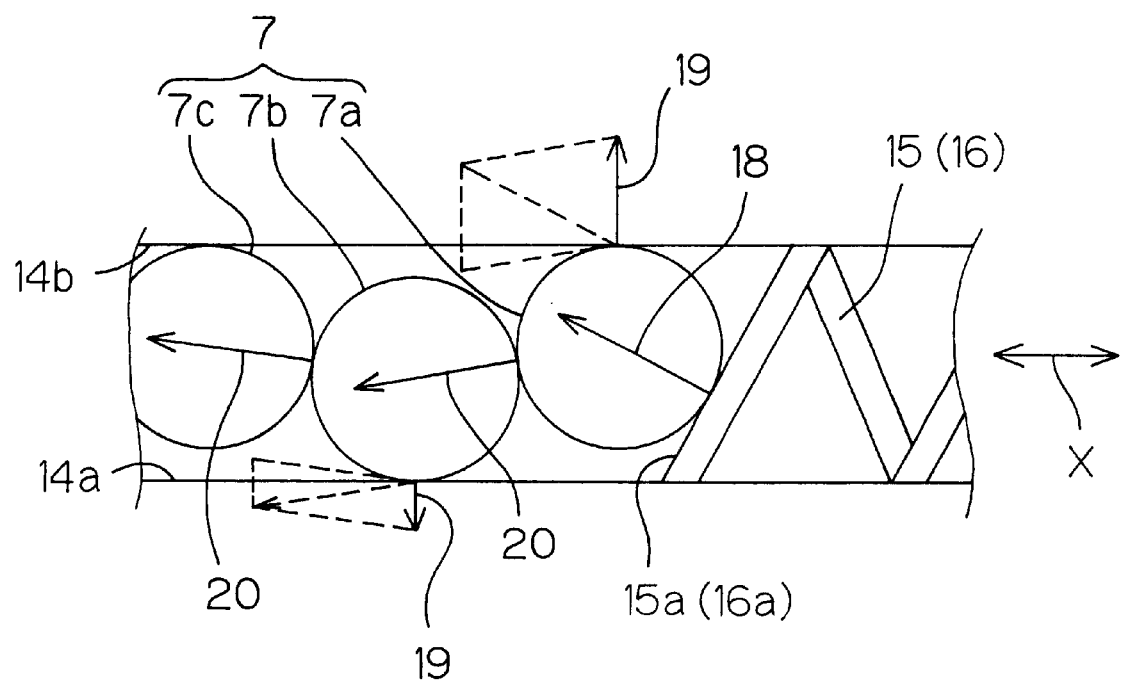
FIG. 4 is a schematic diagram showing components of a pressing force of a compression spring applied to balls and raceway surfaces.

FIG. 4 is a schematic diagram illustrating component forces applied to individual balls 7a, 7b, 7c (collectively referred to as "balls 7") and the raceways 14a, 14b, the component forces derived from a biasing force 18 of the compression spring 15 (16). The raceway groove has a slightly greater radius than that of the ball 7 for the purposes of ensuring durability and reducing sliding load. Therefore, if the balls 7 are not subject to the biasing force, there exists a gap allowing the free play of the balls 7 in the raceway groove. In contrast, the embodiment is designed to prevent the occurrence of the above gap.

Specifically, the compression spring 15, 16 is in direct contact with the ball 7a at one end of the ball array 7, thus pressing this ball 7a in an angled direction relative to the axial direction x. The biasing force 18 of the compression spring 15 (or 16) is divided into, for example, a component force 19 pressing the ball 7a against the raceway 14b and a component force 20 pressing the adjoining ball 7b. The pressing force 20 to the ball 7b is divided into, for example, the component force 19 pressing the ball 7b against the raceway 14a and the component force 20 pressing the adjoining ball 7c. In this manner, all the balls 7 are at least pressed against either one of the raceways 14a, 14b. This is effective to prevent noises produced by the moving balls 7. This is also effective to decrease a rotationwise rattle between the inner shaft 5 and the outer shaft 6 so that a lowered response performance to the steering operation or noises due to the rattling may be prevented. In addition, these features can be realized at low cost simply by designing the configuration of the end portions 15a, 16a of the compression springs 15, 16.

It is noted, however, that the configuration of the first-end portions 15a, 16a of the compression springs 15, 16 are not limited to the open-end type and any other configuration may be employed so long as the balls 7 at the opposite ends of the array can be each biased in an angled direction relative to the axial direction X.

Figure 5A:
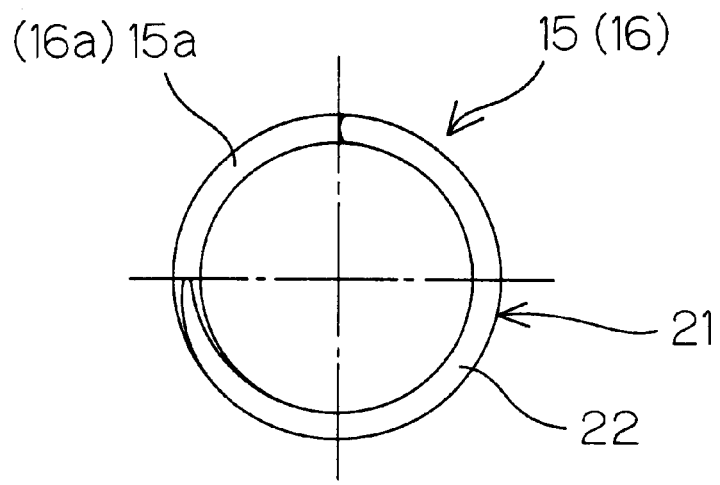
FIGS. 5A and 5B are a front view of a compression spring according to another embodiment of the invention and a sectional view of a principal portion of the compression spring.
Figure 5B:
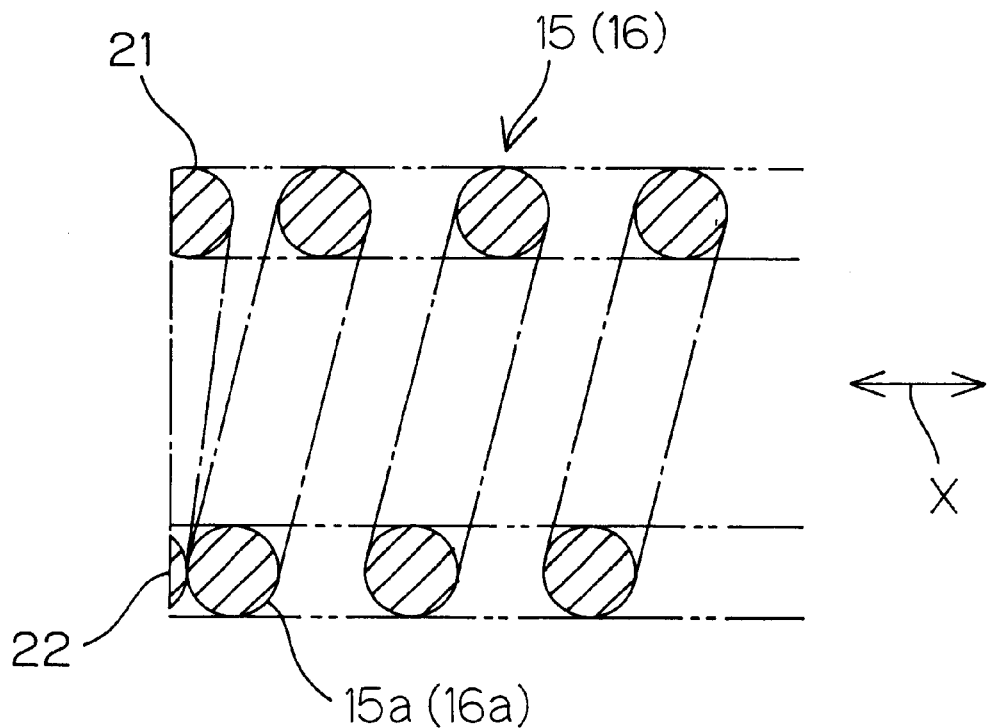

As shown in FIGS. 5A and 5B for example, there may be used a closed-end compression coil 15 (16) having an end-turn portion 21 at the first-end portion 15a (16a) thereof, the end-turn portion 21 designed to extend not more than ¾ of the overall circumference thereof. In this case, a bearing surface 22 of the end-turn portion 21 covers not more than ¾ of the overall circumference so that the compression spring is adapted to bias an array-end ball 7 in an angled direction relative to the axial direction X. The end-turn portion 21 extending ¾ of the overall circumference thereof is preferred in that the bearing surface 22 and the ball 7 define a greater contact area therebetween, which ensures a stable biasing of the ball 7.

Figure 6:
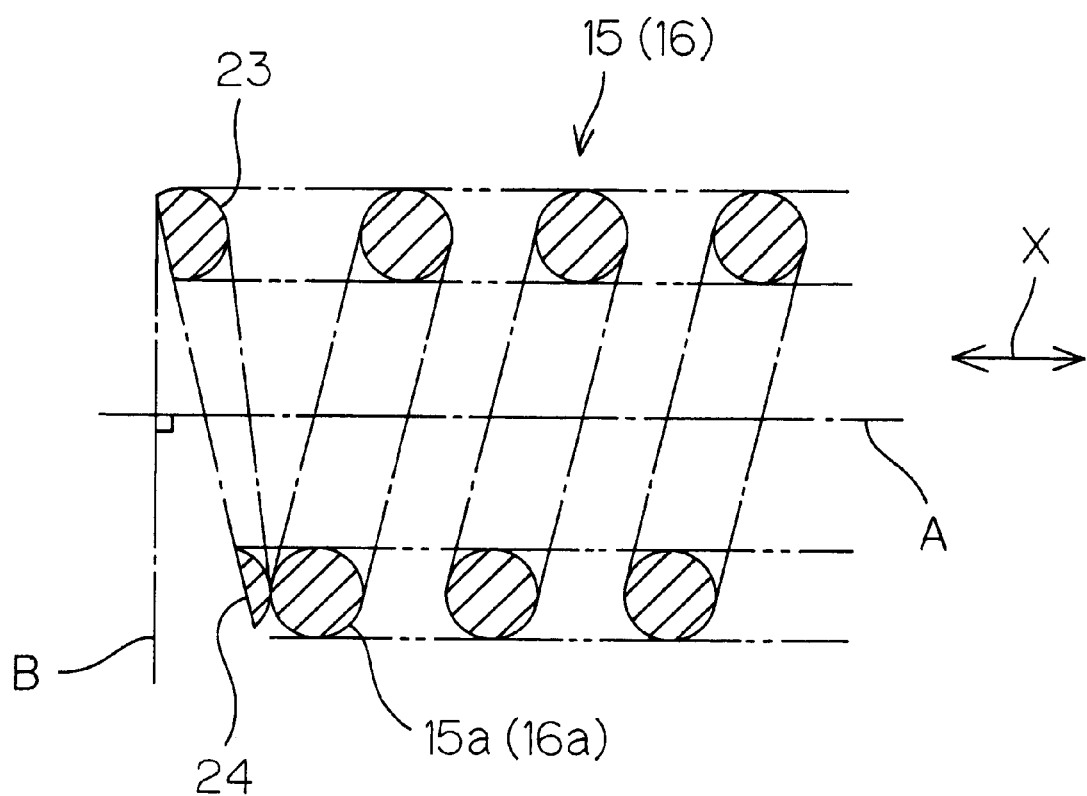
FIG. 6 is a sectional view of a principal portion of a compression spring according to still another embodiment of the invention.

As shown in FIG. 6, an alternative arrangement may be made for biasing the array-end ball 7 in an angled direction relative to the axial direction X. That is, the compression spring 15 (16) has an end-turn portion 23 at the first-end portion 15a (16a) thereof, the end-turn portion 23 having a bearing surface 24 inclined at a given angle relative to a plane B orthogonal to a coil axis A.

Figure 7:
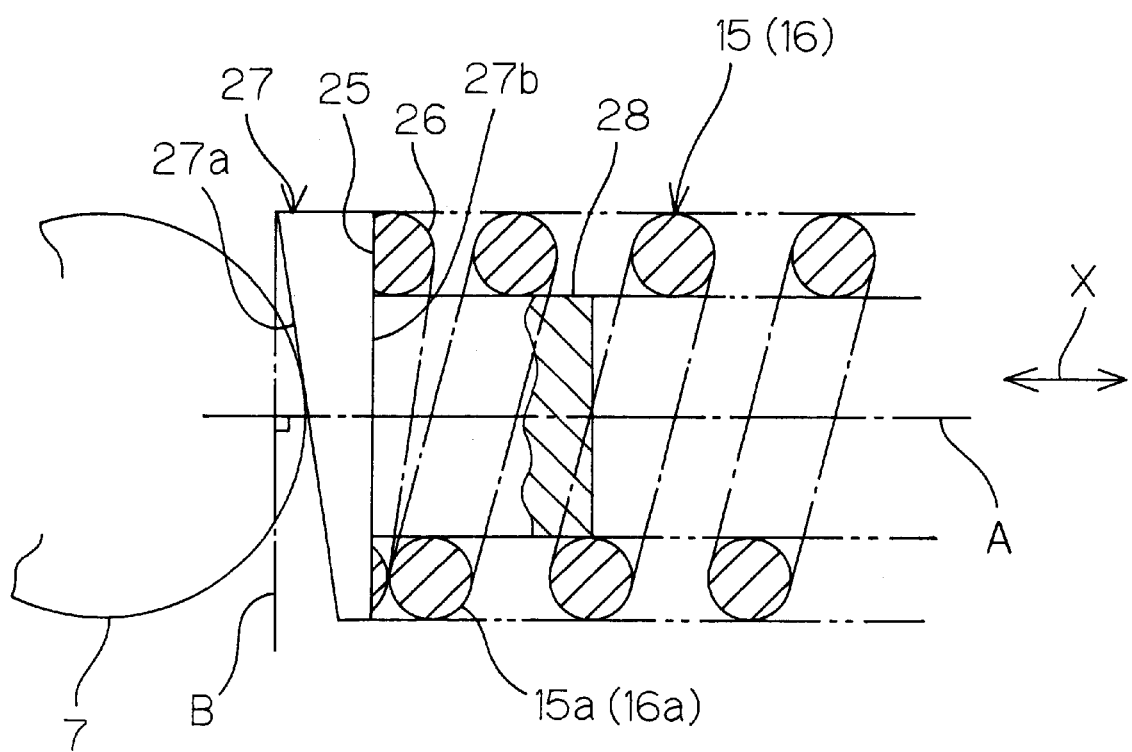
FIG. 7 is a side view, partly in section, of a principal portion of a ball spline joint according to yet another embodiment of the invention.

As shown in FIG. 7, another arrangement may be made such that the first-end portion 15a (16a) of the compression spring 15 (16) includes an end-turn portion 26 having a bearing surface 25 orthogonal to the coil axis A and that a spacer 27 is interposed between the bearing surface 25 and the array-end ball 7.

One end surface 27a of the spacer 27 is inclined at a given angle relative to the plane B orthogonal to the coil axis A so that the compression spring is adapted to bias the array-end ball 7 in the angled direction relative to the axial direction X.

The other-end surface 27b of the spacer 27 is in parallel with the plane B orthogonal to the coil axis A, thus maintaining an intimate contact with the bearing surface 25 for receiving the same. Furthermore, a column-like shaft portion 28 projects from the other-end surface 27b of the spacer 27 into the first-end portion 15a (16a) of the compression spring 15 (16) thereby to be retained by the spring.

The invention should not be limited to the foregoing description of the embodiments thereof. For instance, the resilient member may be provided only at one end of the ball array 7. Furthermore, other various changes and modifications may be made within the scope of the invention.

What is claimed is:

1. A ball spline joint for interconnecting an inner shaft and an outer shaft in a mutually loose-fitted relation so as to allow the shafts to integrally rotate and relatively move from each other in an axial direction, the ball spline joint comprising:
    raceway grooves respectively formed in the inner shaft and the outer shaft in a face-to-face relation and axially extended;
    a plurality of balls interposed between the corresponding raceway grooves of the inner shaft and the outer shaft and forming an array in the axial direction; and
    a resilient member for biasing an array-end ball in an angled direction relative to the axial direction.

2. The ball spline joint as claimed in claim 1, wherein the resilient member includes a compression spring having an end portion in direct contact with the array-end ball; and
    wherein the end portion of the compression spring is configured to bias the array-end ball in the angled direction relative to the axial direction.

3. The ball spline joint as claimed in claim 2, wherein the end portion of the compression spring is provided with an end-turn portion extended not more than ¾ of the overall circumference thereof.

4. The ball spline joint as claimed in claim 2, wherein the end portion of the compression spring is provided with an end-turn portion having a bearing surface inclined relative to a plane orthogonal to an axis of the compression spring.

5. The ball spline joint as claimed in claim 2, wherein an end portion of the compression spring has an open-end configuration having no end-turn portion.

6. The ball spline joint as claimed in claim 1, further comprising a spacer interposed between an end portion of the resilient member and the array-end ball, wherein the resilient member biases the array-end ball in the angled direction relative to the axial direction.

7. The ball spline joint as claimed in claim 6, wherein the spacer has a first surface contacting the array-end ball and a second surface contacting the end portion of the resilient member, the first surface inclined relative to the second surface.

8. The ball spline joint as claimed in claim 6, wherein the resilient member includes a compression spring.

9. An intermediate shaft interposed between a steering shaft and a steering gear and designed to be axially contracted when mounted to a vehicle or absorbing an impact energy, the intermediate shaft comprising:
    an inner shaft and an outer shaft in a mutually loose-fitted relation; and
    a ball spline joint for interconnecting the inner shaft and the outer shaft so as to allow the shafts to integrally rotate and relatively move from each other in an axial direction,
    wherein the ball spline joint includes:
        raceway grooves respectively formed in the inner shaft and the outer shaft in a face-to-face relation and axially extended;
        a plurality of balls interposed between the corresponding raceway grooves of the inner shaft and the outer shaft and forming an array in the axial direction; and
        a resilient member for biasing an array-end ball in an angled direction relative to the axial direction.

* * * * *